Patented Nov. 6, 1928.

1,690,305

UNITED STATES PATENT OFFICE.

HARVEY ELMER MANNING, OF LITTLE ROCK, ARKANSAS.

MOLDED ARTICLE AND METHOD OF PREPARING THE SAME.

No Drawing. Application filed April 12, 1927. Serial No. 183,244.

The present invention relates to molded articles and the method of preparing the same, and has for its object the production of fine grained molded articles containing kaolin as the essential constituent of the base, and containing magnesium oxychloride as the bonding or binding agent, the clay being modified by the chemical treatment contained in the process.

Magnesium oxychloride has been heretofore employed as a binding agent in plastic materials and I make no claim broadly to the use thereof as a binding agent. In the preparation of molded articles in which magnesium oxychloride cement has been employed, it has been proposed in certain instances to start with magnesium oxide and to gage the mixture with dilute hydrochloric acid, furnishing the chlorine for the magnesium oxychloride, and no claim is made herein broadly to the use of hydrochloric acid for this purpose.

In accordance with the present invention, I use a kaolin clay and magnesium oxide in about equal proportions, to which mixture I may add any desired material which will be insoluble in the dilute nitro-hydrochloric acid used for gaging the cement. Examples of such coloring matters are numerous, and I mention highly colored iron compounds such as roasted iron ores, lamp black and finely pulverized colored glass as examples of such. The entire mixture is then gaged with hot dilute nitro-hydrochloric acid of about 40% of the U. S. P. strength, namely a mixture of

|  | Parts. by vol. |
|---|---|
| Nitro-hydrochloric acid U. S. P. (or commercial) | 40 |
| Hot water (160° F.) | 60 |

In carrying out the process of the present invention I mix one part of kaolin clay, which may be and is preferably white kaolin clay, with one part of the pulverized magnesium oxide (both in a dry state), and stir these together well. Any desired coloring matter, insoluble in the acid can then be added, and either mixed well with the clay and magnesium oxide or only partially mixed therewith, or the coloring agent can be added at a later stage if desired. I then add enough of the hot 40% solution of nitro-hydrochloric acid to the mixture, for example in a glass mortar, to produce a creamy paste, and I then rub up the mass well in a glass mortar to produce a thorough mixture. If desired the coloring matter may be added just before the end of the mixing operation in order to leave the colors in a mottled or streaky condition, for the production of artistic effect. There is sometimes a further advantage in adding the coloring matters after the bulk of the acid has reacted and has been neutralized, whereby the color is not injured. The amount of the 40% solution of nitro-hydrochloric acid will vary more or less depending upon the amount of coloring matter incorporated and other conditions such as the degree of hydration of the kaolin and the like, but with materials of ordinary grade of purity and dryness, and when no coloring matter is incorporated, I find that for one hundred parts by weight of the mixture of kaolin and magnesium oxide, about an equal amount by weight of the 40% solution, at about 160° F. can be employed to give the most satisfactory results.

The nitro-hydrochloric acid seems to react chemically upon the kaolin, converting this to some extent into a mixture of silica or silicic acid and aluminum chloride, and this in turn reacts with the magnesium oxide, perhaps forming some magnesium hydrosilicate in the mixture in addition to the magnesium oxychloride, both of which serve as binders. The small amount of nitrates present appear to act as a retarding agent upon the setting of the mass, whereby the setting is made very much slower than would be the case if dilute hydrochloric acid were used, especially in the manipulation of this cement for the production of an extremely light product. This renders unnecessary the use of additional retarding agents such as glycerine, gelatine, ammonia and the like which have heretofore been employed in connection with compositions containing magnesium oxychloride cement, which would in this process be highly objectionable for the reason, in my method of procedure I make a thin creamy paste as before stated and then I immediately pour into molds, place same in a tank or cylinder apparatus equipped for the exhaustion of air, thereby relieving the air pressure and aiding in the extremely slow setting of the cement (requiring at least forty-eight hours for the setting and another forty-eight hours for the tempering to prevent checking or cracking). The small amounts of soluble nitrates and nitrites formed in the process are easily eliminated by washing the finished product. The washings show a small amount of soluble nitrates and nitrites which are formed by the nitric acid (which is an oxidizing agent) giving up a portion of its oxygen in the oxy-chlorination process. The vacuum treatment considerably improves the product. The exclusion of air renders necessary the nitric acid in this process, as above stated to form retarding soluble nitrates and nitrites, furnishing oxygen when and as required and by acting more energetically upon the clay to form silicic acid and producing or bringing into use a small amount of aluminum chloride and these in turn reacting with the magnesium oxide and moisture, forming some magnesium hydrosilicate.

The use of the vacuum makes possible the production of a very strong, and at the same time very light product. This is very useful in producing articles such as bowls for tobacco pipes, or linings in pipes, cigar holders, cigarette holders, which are high absorptive and accordingly very useful. This product is very similar in appearance and physical properties (absorption, coloring properties when used as a tobacco pipe, specific gravity, etc.) to genuine meerschaum.

I claim:—

1. In the preparation of molded articles the herein described process which comprises mixing kaolin clay, magnesium oxide and hot dilute nitro-hydrochloric acid, in such proportions as to form a thin pasty mass which will set slowly, upon standing in a vacuum forming a product of low gravity, and allowing the mass to set at substantially below atmospheric pressure, thereafter removing soluble components by a washing operation.

2. In the preparation of molded articles the herein described process which comprises mixing kaolin clay, magnesium oxide, these components being in approximately equal amounts, together with insoluble coloring matter, and hot dilute nitro-hydrochloric acid, in such proportions as to form a thin pasty mass which will set slowly, upon standing in a vacuum, allowing the mass to set at substantially below atmospheric pressure and thereafter removing soluble nitrates by a washing operating to produce a product of low gravity, closely resembling meerschaum.

3. A molded and set mass containing the reaction products of kaolin and magnesium oxide with dilute nitro-hydrochloric acid, in a vacuum and such product being freed from the major part at least of the soluble products formed, viz, soluble nitrates and sometimes nitrites according to the small amount of impurities which may be in the products used.

In testimony whereof I affix my signature.

HARVEY ELMER MANNING.